United States Patent
Ohgushi et al.

(10) Patent No.: US 10,203,895 B2
(45) Date of Patent: Feb. 12, 2019

(54) STORAGE MANAGEMENT APPARATUS, STORAGE SYSTEM, AND STORAGE MANAGEMENT METHOD

(71) Applicant: KABUSHIKI KAISHA TOSHIBA, Tokyo (JP)

(72) Inventors: Toshiaki Ohgushi, Kanagawa (JP); Takashi Usui, Saitama (JP); Takeichiro Nishikawa, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 61 days.

(21) Appl. No.: 15/226,386

(22) Filed: Aug. 2, 2016

(65) Prior Publication Data
US 2017/0038990 A1 Feb. 9, 2017

(30) Foreign Application Priority Data
Aug. 4, 2015 (JP) ................... 2015-154541

(51) Int. Cl.
*G06F 3/06* (2006.01)
*G06F 11/00* (2006.01)

(52) U.S. Cl.
CPC .......... *G06F 3/0631* (2013.01); *G06F 3/0604* (2013.01); *G06F 3/067* (2013.01); *G06F 3/0619* (2013.01); *G06F 3/0653* (2013.01); *G06F 11/008* (2013.01)

(58) Field of Classification Search
CPC ..... G06F 3/0611; G06F 3/0631; G06F 3/0619
See application file for complete search history.

(56) References Cited

U.S. PATENT DOCUMENTS

| 8,032,784 B2 | 10/2011 | Kumano et al. |
| 8,296,608 B2 | 10/2012 | Hirohata et al. |
| 8,880,801 B1 * | 11/2014 | Robins ............... G06F 12/0246 711/114 |
| 9,305,072 B2 | 4/2016 | Urano |

FOREIGN PATENT DOCUMENTS

| JP | 2003-223285 | 8/2003 |
| JP | 2006-79219 | 3/2006 |
| JP | 2010-237854 | 10/2010 |
| JP | 2012-221419 | 11/2012 |
| JP | 5131271 | 1/2013 |
| WO | WO 2008/136074 | 11/2008 |

* cited by examiner

*Primary Examiner* — Ryan Bertram
*Assistant Examiner* — Edmund H Kwong
(74) *Attorney, Agent, or Firm* — Finnegan, Henderson, Farabow, Garrett & Dunner, L.L.P.

(57) ABSTRACT

According to an embodiment of the present invention, a storage management apparatus to manage a plurality of storage combinations which are combinations of storages included in a storage group, includes a combination failure probability calculator and an allocation ratio calculator. The combination failure probability calculator calculates a failure probability of the storage combination based on a failure probability of each of the storages. The allocation ratio calculator calculates an allocation ratio of received data with respect to the storage combination based on the failure probability of the storage combination.

16 Claims, 15 Drawing Sheets

| STORAGE ID | FAILURE PROBABILITY Pi |
|---|---|
| #0 | 0.1 |
| #1 | 0.3 |
| #2 | 0 |
| #3 | 0.1 |
| #4 | 0.2 |
| #5 | 0.1 |
| #6 | 0 |
| #7 | 0.8 |
| #8 | 0.2 |
| ⋮ | ⋮ |
| #m | Pm |

STORAGE FAILURE PROBABILITY TABLE

FIG. 5

| COMBINATION ID | C1 | C2 | C3 | C4 | C5 | ... | Cn |
|---|---|---|---|---|---|---|---|
| RACK 1 | #0 | #1 | #5 | #8 | #7 | ... | #X |
| RACK 2 | #6 | #3 | #0 | #4 | #3 | ... | #Y |
| RACK 3 | #4 | #7 | #2 | #0 | #5 | ... | #Z |

STORAGE COMBINATION TABLE

FIG. 6

| COMBINATION ID | C1 | C2 | C3 | C4 | C5 | ... | Cn |
|---|---|---|---|---|---|---|---|
| COMBINATION FAILURE PROBABILITY $P_{cj}$ | 0 | 0.024 | 0 | 0.004 | 0.008 | ... | Px * Py * Pz |

COMBINATION FAILURE PROBABILITY TABLE

FIG. 7

| COMBINATION ID | C1 | C2 | C3 | C4 | C5 | ... | Cn |
|---|---|---|---|---|---|---|---|
| ALLOCATION RATIO $w_{cj}$ | $k/(P_{c1}+\alpha)$ | $k/(P_{c2}+\alpha)$ | $k/(P_{c3}+\alpha)$ | $k/(P_{c4}+\alpha)$ | $k/(P_{c5}+\alpha)$ | ... | $k/(P_{cn}+\alpha)$ |
| HASH RANGE | $0 \sim h_1-1$ | $h_1 \sim h_2-1$ | $h_2 \sim h_3-1$ | $h_3 \sim h_4-1$ | $h_4 \sim h_5-1$ | ... | $h_{n-1} \sim h_n-1$ |

ALLOCATION RATIO TABLE

FIG. 8

| STORAGE ID | USE FREQUENCY Ui |
|---|---|
| #0 | $w_{c1} + w_{c3} + w_{c4} \cdots$ |
| #1 | $w_{c2} + \cdots$ |
| #2 | $w_{c3} + \cdots$ |
| #3 | $w_{c2} + w_{c5} + \cdots$ |
| #4 | $w_{c1} + w_{c4} + \cdots$ |
| #5 | $w_{c3} + w_{c5} + \cdots$ |
| #6 | $w_{c1} + \cdots$ |
| #7 | $w_{c2} + w_{c5} + \cdots$ |
| #8 | $w_{c4} + \cdots$ |
| : | : |
| #m | $U_m = \sum_{j=1}^{n} w_{cj} INC(m, c_j)$ |

USE FREQUENCY TABLE

FIG. 14

STORAGE MANAGEMENT APPARATUS, STORAGE SYSTEM, AND STORAGE MANAGEMENT METHOD

CROSS-REFERENCE TO RELATED APPLICATION(S)

This application is based upon and claims the benefit of priority from Japanese Patent Application No. 2015-154541, filed Aug. 4, 2015; the entire contents of which are incorporated herein by reference.

FIELD

Embodiments described herein relate generally to a storage management apparatus, a storage system, and a storage management method.

BACKGROUND

Storage systems are conventionally used which replicate received data received from clients or the like and store respectively the replicated received data in different storages. In such storage systems, since the same received data is stored in a plurality of storages, it is possible to reduce a probability that the received data may be lost.

However, with the conventional storage systems, combinations of storages that store the same received data and allocation ratios of the received data corresponding to the respective combinations are fixed. For this reason, when a failure probability of a combination as a whole increases due to an increase of a frequency of use or an energizing time, the received data stored in the combination may be lost.

BRIEF DESCRIPTION OF THE DRAWINGS

FIG. 5 is a diagram illustrating an example of a storage failure probability table;

FIG. 6 is a diagram illustrating an example of a storage combination table;

FIG. 7 is a diagram illustrating an example of a combination failure probability table;

FIG. 8 is a diagram illustrating an example of an allocation ratio table;

FIG. 14 is a diagram illustrating an example of a frequency of use table;

DETAILED DESCRIPTION

According to an embodiment of the present invention, a storage management apparatus to manage a plurality of storage combinations which are combinations of storages included in a storage group, includes a combination failure probability calculator and an allocation ratio calculator. The combination failure probability calculator calculates a failure probability of the storage combination based on a failure probability of each of the storages. The allocation ratio calculator calculates an allocation ratio of received data with respect to the storage combination based on the failure probability of the storage combination.

Below, a description is given of embodiments of the present invention with reference to the drawings. The present invention is not limited to the embodiments.

First Embodiment

A storage system according to a first embodiment will be described with reference to FIG. 1 to FIG. 12.

Figure 1:
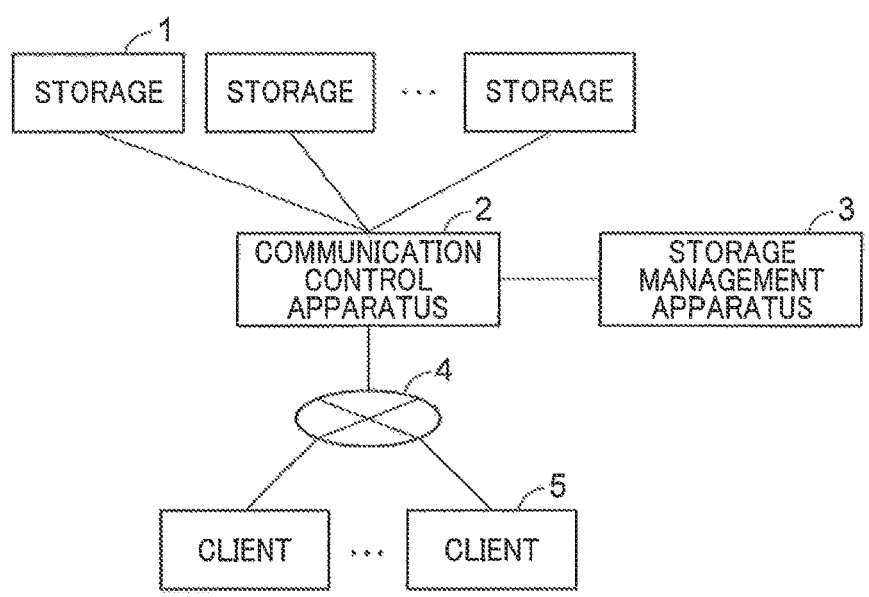
FIG. 1 is a diagram illustrating a schematic configuration of a storage system according to a first embodiment.

FIG. 1 is a diagram illustrating a schematic configuration of the storage system according to the present embodiment. As shown in FIG. 1, this storage system is provided with a plurality of storages 1, a communication control apparatus 2 and a storage management apparatus 3. The storage system is connected to a network 4 via the communication control apparatus 2 and connected to a plurality of clients 5 via the network 4.

The storages 1 store data received by the storage system from the clients 5 (hereinafter referred to as "received data"). Examples of the storage 1 include one or a plurality of HDDs (hard disk drive), an HDD platter, an HDD sector, one or a plurality of SSDs (solid state drive), an SSD memory chip and an SSD block. Hereinafter, the plurality of storages 1 included in the storage system will be referred to as a "storage group."

The communication control apparatus 2 is connected to the network 4 and controls transmission/reception of data between the storage system and the clients 5 according to commands from the storage management apparatus 3. More specifically, the communication control apparatus 2 receives received data from the clients 5 via the network 4 and stores the received data in a certain storage 1 specified by the storage management apparatus 3.

The storage management apparatus 3 (hereinafter referred to as "management apparatus 3") manages the storage group.

To be more specific, the management apparatus 3 manages which storage 1 should store the received data.

When the communication control apparatus 2 receives received data, the management apparatus 3 specifies a storage 1 that stores the received data. The management apparatus 3 will be described in more detail later.

Here, an overview of the storage system according to the present embodiment will be described with reference to FIG. 2 and FIG. 3.

In the present embodiment, a plurality of storage combinations are set in advance for the storage group. The "storage combination" means a combination of one or a plurality of storages 1 included in the storage group. That is, each storage combination includes one or a plurality of storages 1.

The number of storages 1 included in each storage combination may be equal or unequal. Moreover, each storage 1 may be included in one storage combination or may be included in a plurality of storage combinations.

When each storage combination includes a plurality of storages 1, installation locations of the respective storages 1 included in the same storage combination are preferably different from one another. Different installation locations mean that the respective storages 1 are installed in different racks, rooms, floors or buildings or the like.

Figure 2:
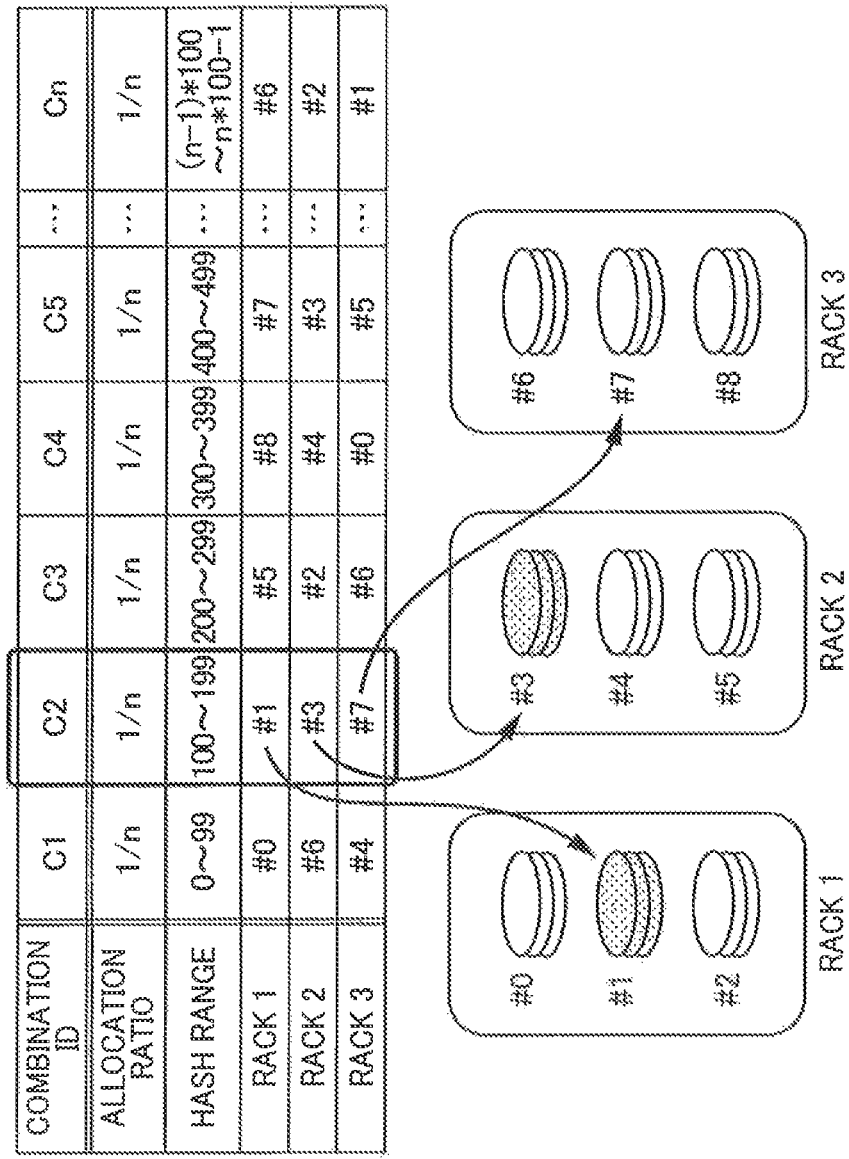
FIG. 2 is a diagram describing an overview of the storage system according to the first embodiment.

FIG. 2 is a diagram describing an overview of the storage system according to the present embodiment.

In FIG. 2, "#i" is a storage ID to identify each storage 1 and "Cj" is a combination ID to identify each storage combination.

In the example in FIG. 2, a storage group includes nine storages #i (i=0 to 8) and n storage combinations Cj (j=1 to n) are set for the storage group.

Each storage combination Cj includes three storages #i installed in different racks. For example, the storage combination C2 includes storage #1 installed in rack 1, storage #3 installed in rack 2 and storage #7 installed in rack 3.

The received data received by the communication control apparatus 2 in the present embodiment is allocated to any one storage combination Cj set in the storage group. Each storage #i included in the storage combination Cj to which the received data is allocated stores data corresponding to the received data.

For example, when certain received data is allocated to the storage combination C2 in FIG. 2, the data corresponding to the received data is stored in storages #1, #3 and #7.

The data corresponding to the received data stored in each storage #i may be replicated data obtained by replicating the received data or may be divided data obtained by dividing the received data and adding an erasure code, or may be data obtained by adding predetermined information (e.g., meta data) to the replicated data or the divided data. In all cases, since the stored received data is made redundant, it is possible to prevent loss of the received data.

In the present embodiment, the received data is allocated to each storage combination Cj at a predetermined ratio. This ratio is called an "allocation ratio." For example, when an allocation ratio of a certain storage combination Cj is $\frac{1}{10}$, $\frac{1}{10}$ of all received data is allocated to the storage combination Cj.

In order to realize such allocation of received data, a hash range is set in each storage combination Cj. The "hash range" is a range of hash values. The hash range of each storage combination Cj is set in accordance with an allocation ratio of each storage combination Cj.

That is, a hash range of a certain storage combination Cj is set such that the ratio of the hash range of the storage combination Cj with respect to the whole hash range coincides with the allocation ratio of the storage combination Cj.

For example, when the allocation ratio of the storage combination Cj is $\frac{1}{10}$, the hash range of the storage combination Cj is set to be $\frac{1}{10}$ of the whole hash range.

The management apparatus 3 according to the present embodiment calculates a hash value of the received data using a hash function and allocates the received data to the storage combination Cj in which the hash range including the calculated hash value is set.

In the example in FIG. 2, the allocation ratio of each storage combination Cj Is 1/n and the whole hash range is 0 to n×100−1. (j−1)×100 to j×100−1 is set as a hash range in each storage combination Cj. For example, the hash range of the storage combination C2 is 100 to 199. Therefore, when a hash value of certain received data is 154, the received data is allocated to the storage combination C2.

Using such an allocation method, the received data can be allocated to the storage combination Cj according to the allocation ratio of the storage combination Cj.

In conventional storage systems, an allocation ratio set in each storage combination Cj is fixed. For this reason, even when a failure probability Pcj of the storage combination Cj increases, received data is allocated to the storage combination Cj according to an initially set allocation ratio.

In contrast, the management apparatus 3 according to the present embodiment changes the allocation ratio set in the storage combination Cj in accordance with the failure probability Pcj of the storage combination Cj. More specifically, the management apparatus 3 decreases the allocation ratio set in the storage combination Cj as the failure probability Pcj of the storage combination Cj increases.

Figure 3:
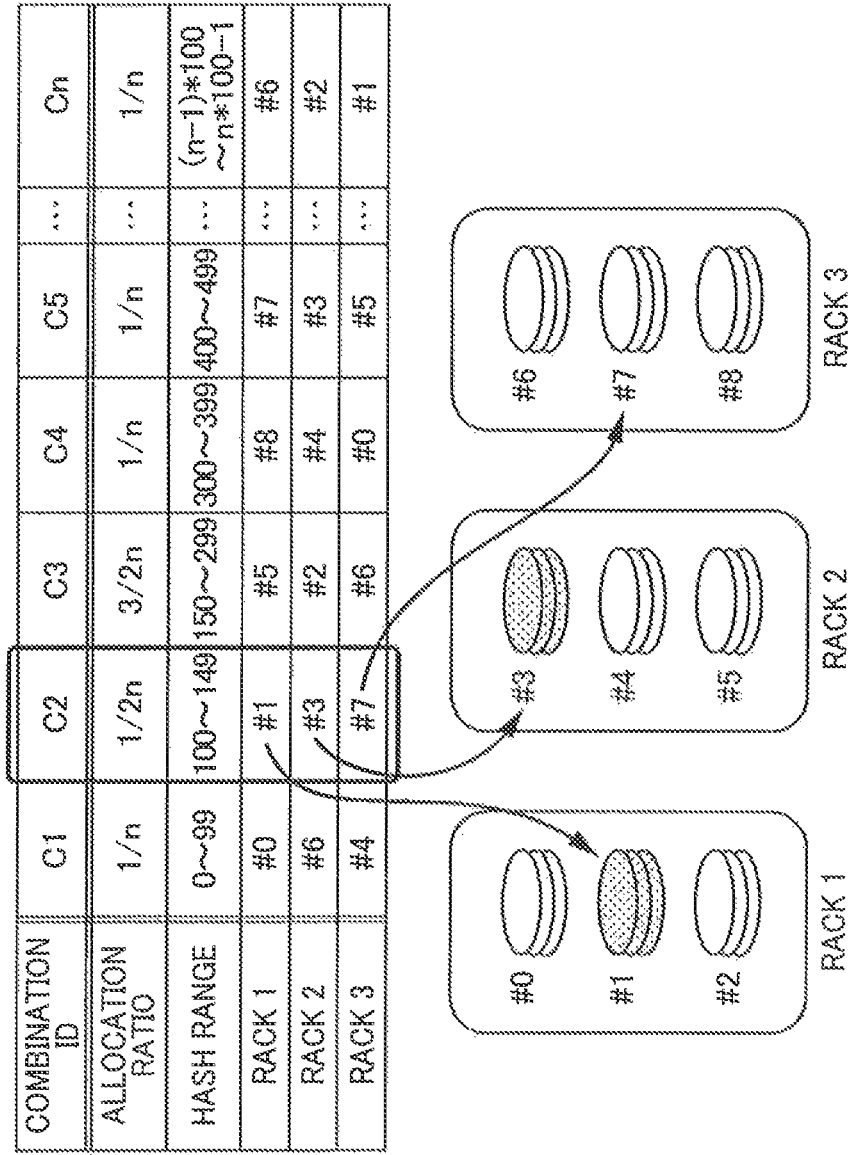
FIG. 3 is a diagram describing an overview of the storage system according to the first embodiment.

For example, when conditions of the storages #1 and #3 in FIG. 2 become worse and the failure probability Pcj of the storage combination C2 increases, the management apparatus 3 updates the allocation ratio C2 and decreases the allocation ratio of the storage combination C2 as shown in FIG. 3. In the example in FIG. 3, the allocation ratio of the storage combination C2 is updated to $\frac{1}{2}$n. Accordingly, the hash range of the storage combination C2 is updated to 100 to 149.

According to the present embodiment, it is possible to suppress losses of received data by reducing the allocation ratio of the storage combination Cj having a high failure probability Pcj. Note that the failure probability Pcj will be described in more detail later.

Here, the management apparatus 3 will be described in detail with reference to FIG. 4 to FIG. 8. Hereinafter, it is assumed that (m+1) storages #i (i=0 to m) are included in the storage group and n storage combinations Cj (j=1 to n) are set.

Figure 4:
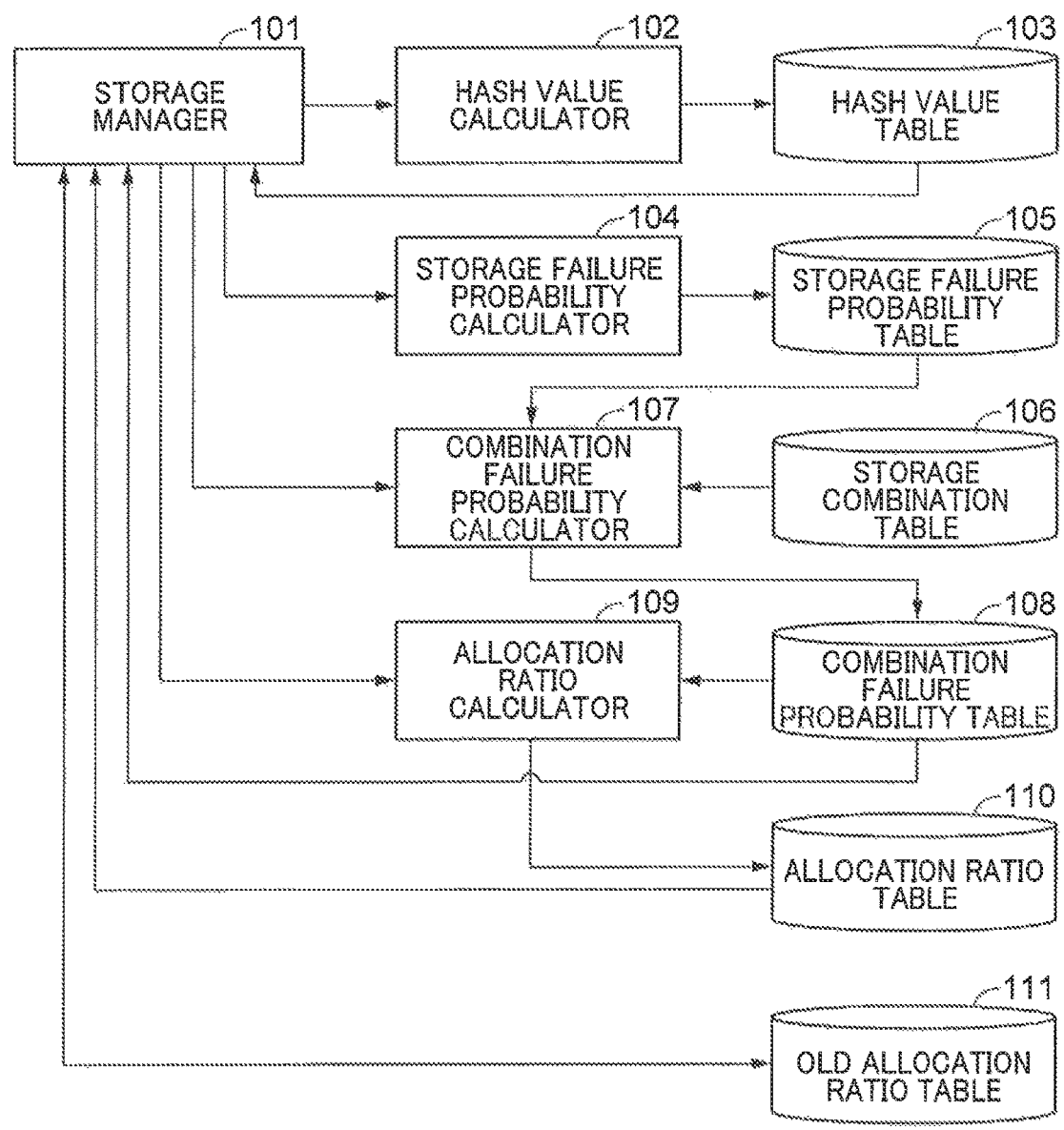
FIG. 4 is a diagram illustrating an example of a functional configuration of a storage management apparatus according to the first embodiment.

FIG. 4 is a diagram illustrating an example of a functional configuration of the management apparatus 3 according to the present embodiment. As shown in FIG. 4, the management apparatus 3 is provided with a storage manager 101, a hash value calculator 102, a hash value table 103, a storage failure probability calculator 104, a storage failure probability table 105, a storage combination table 106, a combination failure probability calculator 107, a combination failure probability table 108, an allocation ratio calculator 109, an allocation ratio table 110 and an old allocation ratio table 111.

The storage manager 101 supervises overall operation of the management apparatus 3. Furthermore, the storage manager 101 transmits/receives data to/from an external device via the communication control apparatus 2. In one example, the storage manager 101 receives information on received data from the communication control apparatus 2. In another example, the storage manager 101 receives information on each storage #i from the storage group.

The hash value calculator 102 calculates a hash value of the received data using a hash function.

The hash value calculator 102 can use any given existing hash coding. As an example of a key of the hash function, a file name of the received data or the like can be used. For example, the hash value calculator 102 stores the calculated hash value in the hash value table 103 in association with the file name or the like of the received data.

The hash value table 103 stores the hash value calculated by the hash value calculator 102. The hash value of the received data is stored in association with the file name or the like in the hash value table 103. The hash value table 103 is used to search received data stored in the storage group.

The storage failure probability calculator 104 calculates a failure probability Pi of each storage #i based on a physical characteristic value or a manufacturing attribute value of each storage #i. Examples of the physical characteristic value include the number of total times of reading and writing data, the number of total retries of reading and writing data, the number of times of writing or reading data, the number of retries of reading or writing data, operating time, energizing time, reading error rate, writing error rate, total error rate of reading and writing, response speed and error rate defined to be vendor-specific (so-called, S.M.A.R.T. information). Examples of the manufacturing attribute value include a maker, lot number, number of disks, number of chips, manufacturing maker, place of manufacture, firmware version, and manufacturing date and time.

The failure probability Pi refers to a value with which the condition of the storage #i is evaluated. The poorer the condition of the storage #i, the higher the failure probability Pi becomes. Therefore, the higher the failure probability Pi, the higher is the possibility that the storage #i may lose the stored data.

The storage failure probability calculator 104 can calculate the failure probability Pi using any given existing method. The storage failure probability calculator 104 stores the calculated failure probability Pi of each storage #i in the storage failure probability table 105.

The storage failure probability table 105 stores the failure probability Pi of the storage #i calculated by the storage failure probability calculator 104. FIG. 5 is a diagram illustrating an example of the storage failure probability table 105. In the example in FIG. 5, failure probabilities P0 to Pm of storages #0 to #m are stored respectively. For example, a failure probability P0 of the storage #0 is 0.1.

The storage combination table 106 stores each storage combination Cj set in the storage group. FIG. 6 is a diagram illustrating an example of the storage combination table 106. In the example in FIG. 6, n storage combinations Cj (j=1 to n) are stored. Each storage combination Cj includes three storages #i arranged in respective different racks. For example, the storage combination C1 includes storages #0, #4 and #6.

The combination failure probability calculator 107 calculates a failure probability Pcj of each storage combination Cj based on the failure probability Pi of each storage #i and each storage combination Cj.

The failure probability Pcj is a value with which the condition of the storage combination Cj is evaluated. The poorer the condition of each storage #i included in the storage combination Cj, the higher the failure probability Pcj becomes. Therefore, the higher the failure probability Pcj, the higher is the possibility that the storage combination Cj may lose the stored data.

The combination failure probability calculator 107 calculates the failure probability Pcj based on a failure probability Pi of each storage #i included in the combination Cj. For example, the combination failure probability calculator 107 calculates a product, a sum or a maximum value of the failure probability Pi of each storage #i included in the storage combination Cj as the failure probability Pcj. The failure probability Pcj may also be calculated based on a discretized failure probability Pi. The "discretization" referred to here means rounding of the value of the failure probability Pi by rounding up, rounding down or rounding off or the like.

In the examples of FIG. 5 and FIG. 6, the storage combination C1 includes storages #0, #4 and #6 and the failure probability Pi is P0=0.1, P4=0, and P6=2.0 respectively. In this case, the failure probability Pc1 of the storage combination C1 becomes 0 (=P0×P4×P6), 2.8 (=P0+P4+P6) or 2.0 (=max (P0, P4, P6)).

Note that the method for calculating the failure probability Pcj is not limited to the above-described method. The combination failure probability calculator 107 can calculate the failure probability Pcj using any given method utilizing the failure probability Pi. Furthermore, when only one storage #i is included in the storage combination Cj, the combination failure probability calculator 107 may calculate the failure probability Pi of the storage #i as the failure probability Pcj of the storage combination Cj. The combination failure probability calculator 107 stores the calculated failure probability Pcj in the combination failure probability table 108.

The combination failure probability table 108 stores the failure probability Pcj of each storage combination Cj calculated by the combination failure probability calculator 107. FIG. 7 is a diagram illustrating an example of the combination failure probability table 108. In the example in FIG. 7, failure probabilities Pc1 to Pcn of storage combinations C1 to Cn are stored respectively and each failure probability Pcj is calculated as a product of the failure probabilities Pi. For example, a failure probability Pc1 of the storage combination C1 is 0 (=P0×P4×P6).

The allocation ratio calculator 109 calculates an allocation ratio wcj of each storage combination Cj based on the failure probability Pcj of each storage combination Cj. The allocation ratio calculator 109 calculates an allocation ratio wcj such that the higher the failure probability Pcj, the smaller the allocation ratio wcj becomes as described above. The allocation ratio wcj is calculated by the following equation, for example.

[Formula 1]

$$w_{cj} = k/(P_{cj} + \alpha) \qquad (1)$$

In equation (1), $\alpha$ ($\geq 0$) is a constant to adjust a variation of the allocation ratio wcj and k is a normalization constant. The normalization constant k is calculated by the following equation, for example.

[Formula 2]

$$k = \Sigma_{j=1}^{n}(P_{cj} + \alpha)^{-1} \qquad (2)$$

By calculating the allocation ratio wcj in this way, the higher the failure probability Pcj, the smaller the allocation ratio wcj becomes. The allocation ratio calculator 109 stores the calculated allocation ratio wcj in the allocation ratio table 110.

Furthermore, the allocation ratio calculator 109 calculates a hash range of each storage combination Cj based on the calculated allocation ratio wcj. The hash range of the storage combination Cj is calculated by the following equation, for example.

[Formula 3]

$$h_j = h_{max} \Sigma_{s=1}^{j} w_{cs} \qquad (3)$$

In equation (3), hmax is a maximum value of the hash value in the whole hash range.

The hash range of the storage combination C1 is 0 to $h_1-1$ (=hmax×wc1−1). Furthermore, the hash range of storage combinations C2 to Cn is $h_{j-1}$ to $h_j-1$ (j=2 to n). The allocation ratio calculator 109 stores the calculated hash range of each storage combination Cj in the allocation ratio table 110.

The allocation ratio table 110 stores the allocation ratio wcj and the hash range of each storage combination Cj calculated by the allocation ratio calculator 109. FIG. 8 is a diagram illustrating an example of the allocation ratio table 110. In the example in FIG. 8, the allocation ratio wcj and the hash range of the storage combinations C1 to Cn are stored respectively.

The old allocation ratio table 111 stores the allocation ratio wcj and the hash range before being updated by the allocation ratio calculator 109. The old allocation ratio table 111 is used to re-store the data in the storage group according to the updated allocation ratio wcj' instead of the data stored in the storage group according to the allocation ratio wcj and the hash range before the update.

Next, a hardware configuration of the management apparatus 3 according to the present embodiment will be described with reference to FIG. 9. The management apparatus 3 according to the present embodiment is made up of a computer 30. A server, a client, a microcontroller and a general-purpose computer or the like are included in a category of the computer 30.

The computer 30 that makes up the management apparatus 3 is, for example, a management server or a management node connected to the communication control apparatus 2.

Figure 9:
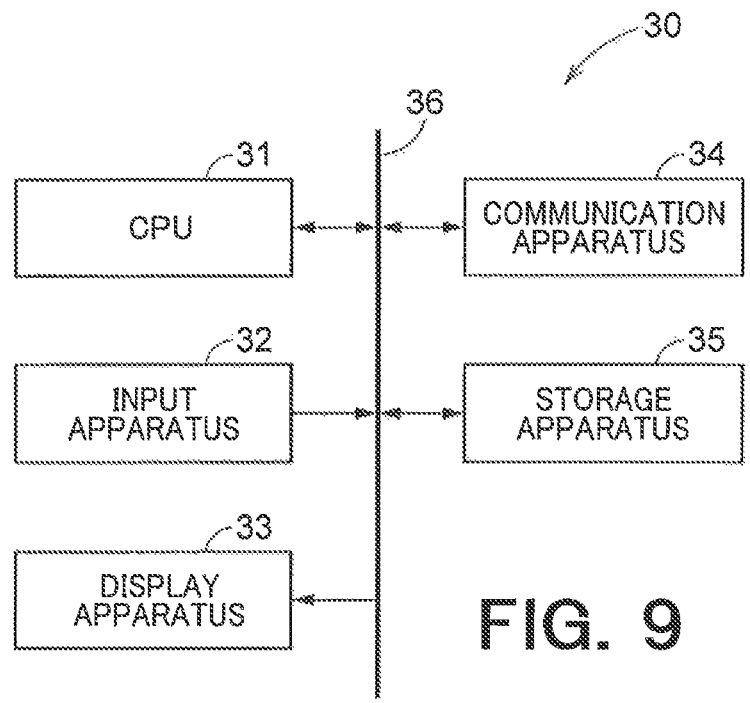
FIG. 9 is a diagram illustrating an example of a hardware configuration of the storage management apparatus according to the first embodiment.

FIG. 9 is a diagram illustrating an example of the computer 30. As shown in FIG. 9, the computer 30 is provided with a CPU (Central Processing Unit) 31, an input apparatus 32, a display apparatus 33, a communication apparatus 34 and a storage apparatus 35. The CPU 31, the input apparatus 32, the display apparatus 33, the communication apparatus 34 and the storage apparatus 35 are mutually connected via a bus 36.

The CPU 31 is an electronic circuit including a control apparatus and a calculation apparatus of the computer 30. The CPU 31 carries out calculation processing based on data or a program inputted from the respective apparatuses (e.g., input apparatus 32, communication apparatus 34 and storage apparatus 35) connected via the bus 36 and outputs the calculation result and control signals to the respective apparatuses (e.g., display apparatus 33, communication apparatus 34 and storage apparatus 35) connected via the bus 36. More specifically, the CPU 31 runs an OS (operating system) and a storage management program or the like of the computer 30 and controls each apparatus making up the computer 30.

The "storage management program" (hereinafter referred to as a "management program") is a program that causes the computer 30 to implement the above-described respective functional configurations of the management apparatus 3. The management program is stored in a non-temporary, tangible and computer-readable storage medium. The above-described storage medium is, for example, an optical disk, a magneto-optical disk, a magnetic disk, a magnetic tape, a flash memory or a semiconductor memory, but the storage medium is not limited to them. The CPU 31 runs the management program, and the computer 30 thereby functions as the management apparatus 3.

The input apparatus 32 is an apparatus to input information to the computer 30. The input apparatus 32 is, for example, a keyboard, a mouse or a touch panel, but the input apparatus 32 is not limited to them. Using the input apparatus 32, the user can input a kind of an execution instruction of an update process of the allocation ratio.

The display apparatus 33 is an apparatus to display an image or video. The display apparatus 33 is, for example, an LCD (liquid crystal display), a CRT (cathode ray tube) or a PDP (plasma display), but the display apparatus 33 is not limited to them. The display apparatus 33 may display the hash value table 103, the storage failure probability table 105, the storage combination table 106, the combination failure probability table 108, the allocation ratio table 110 and the old allocation ratio table 111 or the like.

The communication apparatus 34 is an apparatus for the computer 30 to communicate with an external apparatus wirelessly or wiredly. The communication apparatus 34 is, for example, a modem, a hub or a router, but the communication apparatus 34 is not limited to them. The computer 30 can be connected to the communication control apparatus 2 via the communication apparatus 34.

The storage apparatus 35 is a storage medium to store the OS of the computer 30, a management program, data necessary to execute the management program and data generated by execution of the management program or the like. The storage apparatus 35 includes a main storage apparatus and an external storage apparatus. The main storage apparatus is, for example, a RAM, a DRAM or an SRAM, but the main storage apparatus is not limited to them. The external storage apparatus is, for example, a hard disk, an optical disk, a flash memory or a magnetic tape, but the external storage apparatus is not limited to them. The hash value table 103, the storage failure probability table 105, the storage combination table 106, the combination failure probability table 108, the allocation ratio table 110 and the old allocation ratio table 111 or the like can be constructed on the storage apparatus 35.

Note that the computer 30 may be provided with one or a plurality of CPU(s) 31, input apparatus(es) 32, display apparatus(es) 33, communication apparatus(es) 34 and storage apparatus(es) 35. Peripheral devices such as a printer and a scanner may be connected to the computer 30.

The management apparatus 3 may be made up of a single computer 30 or a system includes a plurality of mutually connected computers 30.

Furthermore, the management program may be stored in the storage apparatus 35 of the computer 30 in advance or may be stored in a storage medium outside the computer 30 or may be uploaded on the Internet. In all cases, the functions of the management apparatus 3 are implemented by installing the management program in the computer 30 and executing the management program.

Figure 10:
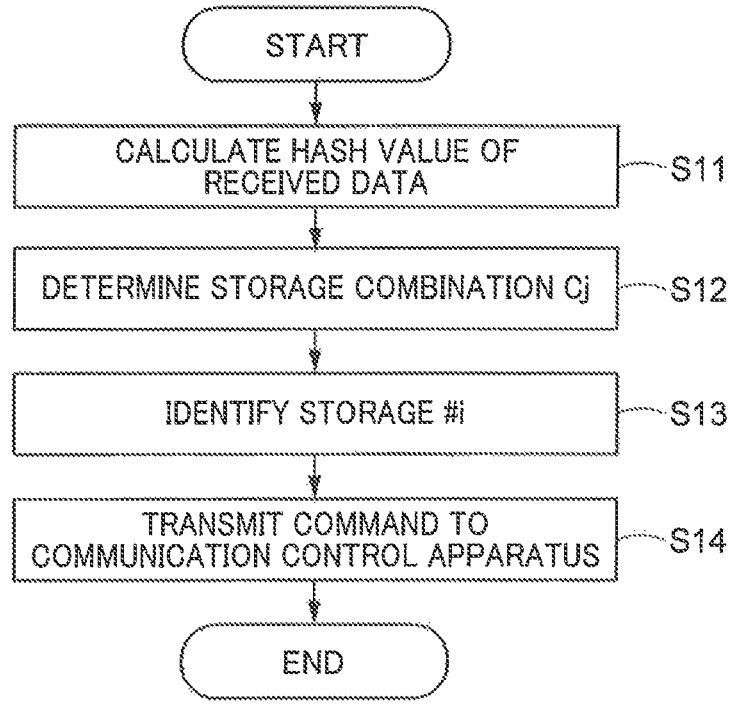
FIG. 10 is a flowchart illustrating a normal operation of the storage management apparatus according to the first embodiment.

Next, operation of the management apparatus 3 according to the present embodiment will be described with reference to FIG. 10 and FIG. 11. First, normal operation of the management apparatus 3 will be described. FIG. 10 is a flowchart illustrating normal operation of the management apparatus 3.

Upon receiving received data from the client 5, the communication control apparatus 2 transmits information on the received data to the storage manager 101. The information on the received data is, for example, a file name or size of the received data, but the information is not limited to them. The communication control apparatus 2 may also transmit the received data itself together with the information on the received data to the storage manager 101.

Upon receiving the information transmitted by the communication control apparatus 2, the storage manager 101 passes the received information to the hash value calculator 102 and causes the hash value calculator 102 to execute a process of calculating a hash value. The hash value calculator 102 calculates the hash value of the received data based on the information on the received data (step S11). The method of calculating the hash value is as described above. The hash value calculator 102 stores the calculated hash value in the hash value table 103.

Next, the storage manager 101 acquires the hash value of the received data from the hash value table 103 and determines a storage combination Cj to which the received data is allocated by referring to the allocation ratio table 110 (step S12). For example, when the hash value of the received data is 150 and the storage manager 101 refers to the allocation ratio table 110 in FIG. 2, the storage combination Cj to which the received data is allocated is determined to be the storage combination C2.

Next, the storage manager 101 identifies a storage #i included in the storage combination Cj to which the received data is allocated by referring to the storage combination table 106 (step S13). In the example in FIG. 2, storages #1, #3 and #7 are identified as storage #i included in the storage combination C2.

After that, the storage manager 101 sends a command to the communication control apparatus 2 to specify the storage #i identified in step S13 as the storage #i to store the received data (step S14).

The communication control apparatus 2 that has received the command stores data corresponding to the received data in the storage #i specified by the storage manager 101. For example, when storages #1, #3 and #7 are specified by the storage manager 101, the communication control apparatus 2 stores data corresponding to the received data in the storages #1, #3 and #7. Processes such as replication and division of the received data and addition of an erasure code may be executed by the communication control apparatus 2 or by the storage manager 101 which has received the received data.

The management apparatus 3 executes the above-described process every time the communication control apparatus 2 receives received data.

Thereby, the received data is stored in the storage group according to the allocation ratio wcj of each storage combination Cj.

Next, an allocation ratio update process by the management apparatus 3 will be described. FIG. 11 is a flowchart illustrating the allocation ratio update process by the management apparatus 3.

First, the storage manager 101 requests a physical characteristic value and a manufacturing attribute value from each storage #i via the communication control apparatus 2 (step S21). Each storage #i that has received the request transmits the physical characteristic value and the manufacturing attribute value. The storage manager 101 receives the transmitted physical characteristic value and manufacturing attribute value of each storage #i via the communication control apparatus 2.

Next, the storage manager 101 passes the received physical characteristic value and manufacturing attribute value of each storage #i to the storage failure probability calculator 104 and causes the storage failure probability calculator 104 to execute a process of calculating a failure probability Pi.

The storage failure probability calculator 104 calculates the failure probability Pi of each storage #i based on the physical characteristic value and the manufacturing attribute value of each storage #i and stores the failure probability Pi in the storage failure probability table 105 (step S22). The method of calculating the failure probability Pi is as described above. Note that when the failure probability Pi can be received from each storage #i, the storage failure probability calculator 104 may store the received failure probability Pi in the storage failure probability table 105 as is.

Next, the storage manager 101 causes the combination failure probability calculator 107 to execute a process of calculating a failure probability Pcj of each storage combination Cj.

The combination failure probability calculator 107 acquires a failure probability Pi of each storage #i from the storage failure probability table 105 and acquires a storage #i included in each storage combination Cj from the storage combination table 106. The combination failure probability calculator 107 calculates a failure probability Pcj of each storage combination Cj based on the acquired information and stores the failure probability Pcj in the combination failure probability table 108 (step S23). The method of calculating the failure probability Pcj is as described above.

After that, the storage manager 101 determines whether or not a storage combination Cj whose failure probability Pcj is greater than a predetermined threshold Pth1 exists by referring to the combination failure probability table 108 (step S24).

When there is no storage combination Cj whose failure probability Pcj is greater than the predetermined threshold Pth1 (NO in step S24), the storage manager 101 terminates the update process. This is because when the failure probability Pcj is low, the data loss probability is low. By avoiding execution of the update process when the failure probability Pcj is low, it is possible to suppress update frequencies, improve stability of operation of the management apparatus 3 or suppress the amount of calculation of the management apparatus 3. Note that the threshold Pth1 can be freely set.

On the other hand, when there is a storage combination Cj whose failure probability Pcj is greater than the threshold Pth1 (YES in step S24), the storage manager 101 copies the allocation ratio table 110 to the old allocation ratio table 111 (step S25). The storage manager 101 causes the allocation ratio calculator 109 to execute a process of calculating the allocation ratio wcj of each storage combination Cj.

The allocation ratio calculator 109 acquires the failure probability Pcj of each storage combination Cj from the combination failure probability table 108. The allocation ratio calculator 109 calculates an allocation ratio wcj and a hash range of each storage combination Cj based on the acquired failure probability Pcj and stores the allocation ratio wcj and the hash range in the allocation ratio table 110 (step S26). The method of calculating the allocation ratio wcj and the hash range is as described above. The allocation ratio wcj and the hash range are thus updated as described with reference to FIG. 2 and FIG. 3.

The management apparatus 3 may execute the above-described update process at a predetermined time interval or according to an execution instruction inputted from a user of the management apparatus 3.

Furthermore, after executing the update process, the storage manager 101 may re-store the data according to an updated allocation ratio wcj' instead of the data stored according to the allocation ratio wcj before the update. For example, in a case where the allocation ratio wcj in FIG. 2 is updated to the allocation ratio wcj' in FIG. 3, while the received data whose hash value is 150 to 199 is stored in the storage combination C3 when the received data is received after the update, the received data whose hash value is 150 to 199 is stored in the storage combination C2 when the received data is received before the update.

In this case, after the update of the allocation ratio wcj, the storage manager 101 may identify the received data whose hash value is 150 to 199 among the received data stored in the storage combination C2 by referring to the hash value table 103, and instruct the communication control apparatus 2 so as to re-store the identified received data in the storage combination C3.

The storage manager 101 may acquire a hash value of the received data to be re-stored by referring to the allocation ratio table 110 in which the updated hash range is stored and the old allocation ratio table 111 in which the hash range before the update is stored.

As described above, the management apparatus 3 according to the present embodiment decreases the allocation ratio wcj of the storage combination Cj as the failure probability Pcj of the storage combination Cj increases. This allows the data loss probability to be reduced.

Here, the data loss probability will be described. A data loss probability $P_{lost}$ in the storage system can be generally evaluated according to the following equation.

[Formula 4]

$$P_{lost} = \Sigma_{j=1}^{n} w_{cj} P_{cj} \quad (4)$$

Figures 11, 12:
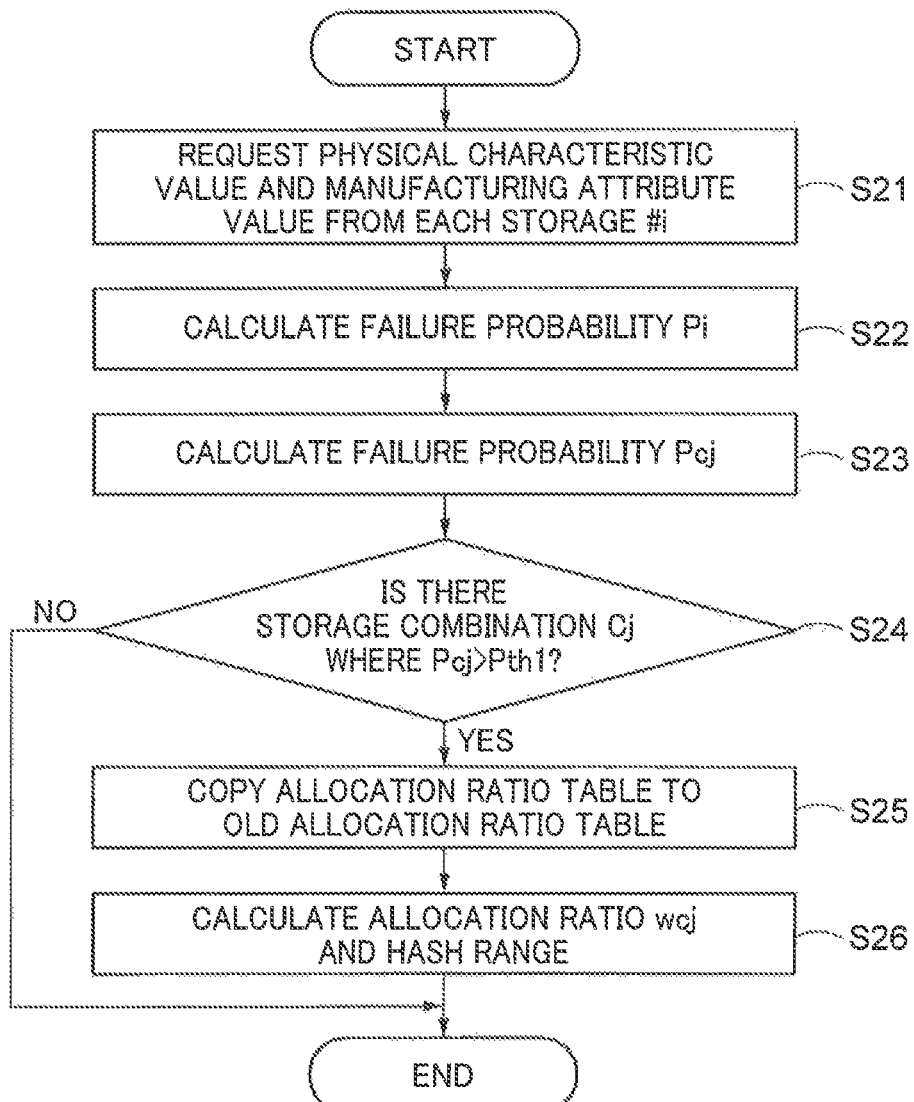
FIG. 11 is a flowchart illustrating an allocation ratio update process by the storage management apparatus according to the first embodiment.
FIG. 12 is a diagram describing a data loss probability.

For example, as shown in FIG. 12, when two storage combinations C1 and C2 are set in the storage group, the failure probability Pc1 is 0.2, the failure probability Pc2 is 0.8, the allocation ratio wc1 is 0.5 and the allocation ratio wc2 is 0.5, the data loss probability $P_{lost}$ in the storage system is 0.5 (=0.2×0.5+0.8×0.5).

The management apparatus 3 according to the present embodiment updates each allocation ratio wcj such that the allocation ratio wcj of the storage combination Cj having a high failure probability Pcj decreases. Therefore, in the example in FIG. 12, update is performed such that the allocation ratio wc2 of the storage combination C2 decreases.

As shown in FIG. 12, when the allocation ratio wc1 is updated to 0.8 and the allocation ratio wc2 s updated to 0.2 by the update process, the data loss probability $P_{lost}$ in the storage system becomes 0.32 (=0.2×0.8+0.8×0.2).

Thus, the management apparatus 3 updates the allocation ratio wcj of each storage combination Cj, and can thereby reduce the data loss probability $P_{lost}$. Therefore, the present embodiment can suppress losses of received data.

The storage system according to the present embodiment is applicable to any given distributed storage system. The storage system according to the present embodiment is preferably applied to an object storage or a storage system in which data arrangement is distributed using a consistent hash coding.

Second Embodiment

Figure 15:
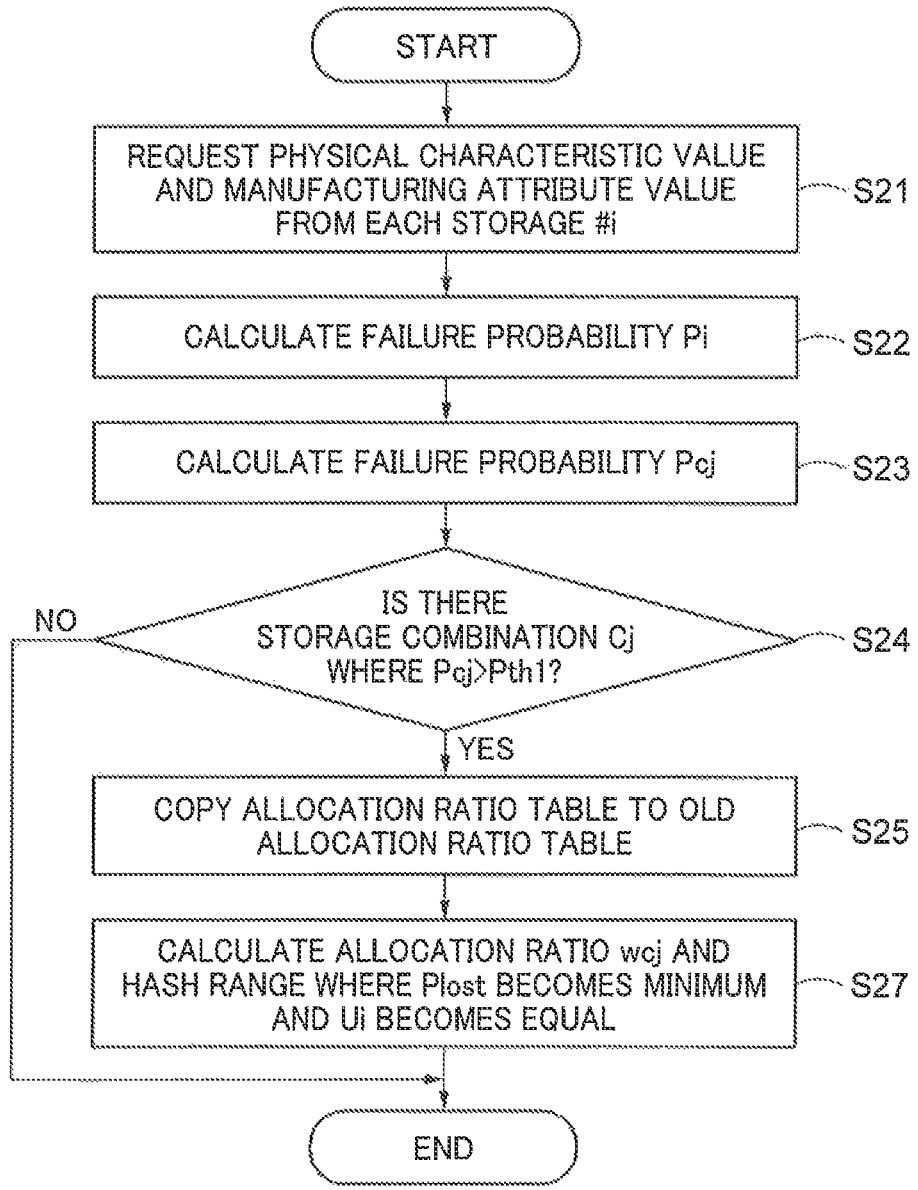
FIG. 15 is a flowchart illustrating an allocation ratio update process by the storage management apparatus according to the second embodiment.

A storage system according to a second embodiment will be described with reference to FIG. 13 to FIG. 15. In the present embodiment, the management apparatus 3 will be described which updates an allocation ratio wcj of each storage combination Cj by taking into account a use frequency of each storage #i.

Figure 13:
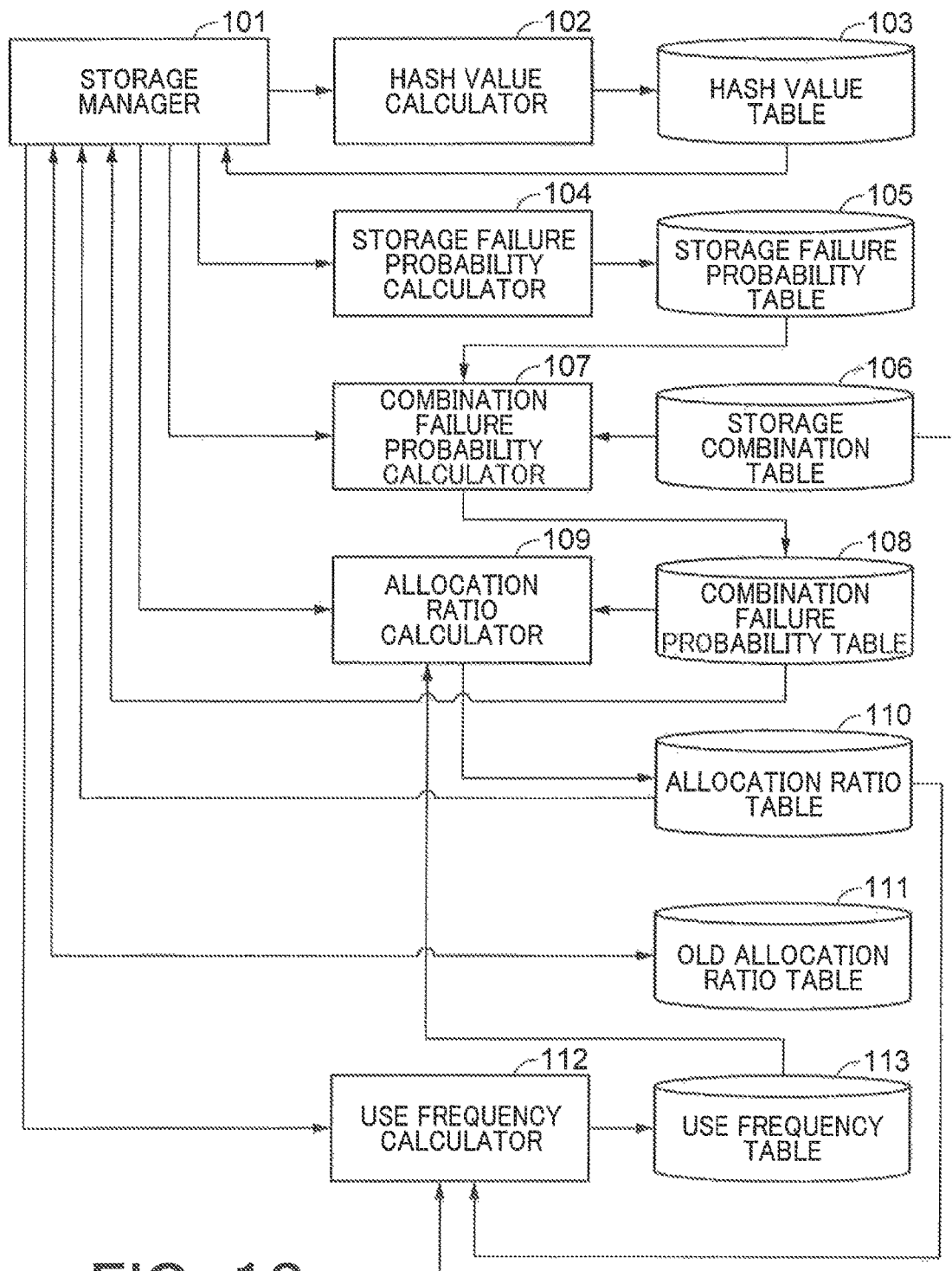
FIG. 13 is a diagram illustrating an example of a functional configuration of a storage management apparatus according to a second embodiment.

FIG. 13 is a diagram illustrating an example of a functional configuration of the management apparatus 3 according to the present embodiment. As shown in FIG. 13, the management apparatus 3 is provided with a use frequency calculator 112 and a use frequency table 113. The rest of the configuration is similar to that of the first embodiment.

The use frequency calculator 112 calculates a use frequency Ui of each storage #i based on the allocation ratio wcj of each storage combination Cj. The use frequency Ui is a value corresponding to a ratio at which the storage #i is used, that is, a ratio at which data is stored in storage #i.

The use frequency Ui is calculated as a sum of allocation ratios wcj of the respective storage combinations Cj in which a storage #i is included. For example, when a certain storage #i is included in the storage combinations C1 and C2, and wc1 is 0.1 and wc2 is 0.2, the use frequency Ui of this storage #i is 0.3 (=0.1+0.2). The use frequency Ui is calculated according to the following equation.

[Formula 5]

$$U_i = \Sigma_{j=1}^{n} w_{cj} INC(i, C_j) \quad (5)$$

In equation (5), INC (i, Cj) is a function which takes 1 when the storage #i is included in the storage combination Cj or 0 when the storage #i is not included in the storage combination Cj. The use frequency calculator 112 stores the calculated use frequency Ui of each calculated storage #i in the use frequency table 113.

The use frequency table 113 stores the use frequency Ui of each storage #i calculated by the use frequency calculator 112. FIG. 14 is a diagram illustrating an example of the use frequency table 113. In the example in FIG. 14, respective operating frequencies U0 to Um of the storages #0 to #m are stored. Each use frequency Ui is expressed by a relational expression of wci. For example, when the storage combination table 106 is in the condition shown in FIG. 6, since the storage #0 is used by the storage combinations C1, C3 and C4, the use frequency U0 is equal to wc1+wc3+wc4.

In the present embodiment, the allocation ratio calculator 109 calculates the allocation ratio wcj by taking into account the use frequency Ui of each storage #i. More specifically, the allocation ratio wcj is calculated such that each storage #i has the equal use frequency UI and the loss probability $P_{lost}$ becomes minimum.

This is equivalent to solving a linear programming problem that finds a combination of wcj that minimizes $P_{lost}$ in equation (4) under a constraint condition of U0= U1= . . . =Um.

The allocation ratio calculator 109 can solve the above-described linear programming problem using any given method. For example, the allocation ratio calculator 109 randomly generates candidate solutions (set of wcj's), calculates loss probability $P_{lost}$ corresponding to the generated candidate solutions and stores the generated candidate solutions in the allocation ratio table 110. Next, the use frequency calculator 112 calculates each use frequency Ui corresponding to the stored candidate solutions and stores the use frequency Ui in the use frequency table 113. The allocation ratio calculator 109 determines whether or not the generated candidate solution satisfies the constraint condition by referring to the use frequency table 113.

When the generated candidate solution does not satisfy the constraint condition, the allocation ratio calculator 109 discards the candidate solution and stores the candidate solution when the generated candidate solution satisfies the constraint condition. The allocation ratio calculator 109 may repeat such processes until an end condition is satisfied and select a candidate solution that minimizes the loss probability $P_{lost}$ among candidate solutions that satisfy the constraint condition.

The end condition can be set freely such as: the number of processing times reaching a predetermined number of times; satisfying the constraint condition and at the same time candidate solutions being obtained whereby the loss probability $P_{lost}$ reaches a predetermined value or less, and so on. Note that the method of calculating the allocation ratio wcj is not limited to the above-described method, but any given solution such as simplex method and interior point method may be used.

The allocation ratio calculator 109 calculates the allocation ratio wcj of each storage combination Cj, then calculates a hash range corresponding to the allocation ratio wcj and stores the allocation ratio wcj and the hash range in the allocation ratio table 110.

Next, a process of updating the allocation ratio wcj by the management apparatus 3 according to the present embodiment will be described with reference to FIG. 15. FIG. 15 is a flowchart illustrating a process of updating the allocation ratio wcj by the management apparatus 3 according to the present embodiment. Note that steps S21 to S25 and normal operation of the management apparatus 3 in the flowchart in FIG. 15 are similar to those of the first embodiment.

In the present embodiment, after step S25, the storage manager 101 causes the allocation ratio calculator 109 and the use frequency calculator 112 to execute a process of calculating the allocation ratio wcj.

As described above, in cooperation with the use frequency calculator 112, the allocation ratio calculator 109 calculates the allocation ratio wcj of each storage combination Cj and the hash range at which the loss probability $P_{lost}$ becomes minimum and the use frequency Ui of each storage #i becomes equal and then stores the allocation ratio wcj of each storage combination Cj and the hash range in the allocation ratio table 110 (step S27). In this way, the allocation ratio wcj and the hash range are updated.

The management apparatus 3 may execute the above-described update process at a predetermined time interval or according to an execution instruction inputted from the user of the management apparatus 3. After the execution of the update process, the storage manager 101 may re-store the data according to the updated allocation ratio wcj' instead of the data stored according to the allocation ratio wcj before the update.

As described above, the management apparatus 3 according to the present embodiment updates the allocation ratio wcj of each storage combination Cj such that the loss probability $P_{lost}$ becomes minimum. It is thereby possible to suppress losses of received data.

Furthermore, the management apparatus 3 according to the present embodiment updates the allocation ratio wcj of each storage combination Cj such that the use frequency Ui of each storage #i becomes equal. It is thereby possible to uniformize the use frequency Ui of each storage #i.

In general, when the same storage #i is used intensively, the condition of the storage #i may deteriorate and the failure probability Pi may increase. In the present embodiment, since the use frequency Ui of each storage #i is uniformalized, it is possible to prevent the above-described deterioration of the storage #i.

Note that in the present embodiment, the constraint condition is not limited to one that the use frequency Ui of each storage #i should be equal. For example, the constraint condition may be such that the use frequencies Ui of all storages #i should be equal to or below a predetermined value or such that a variance or standard deviation of the use frequency Ui of each storage #i should be equal to or below a predetermined value.

Third Embodiment

Figure 16:
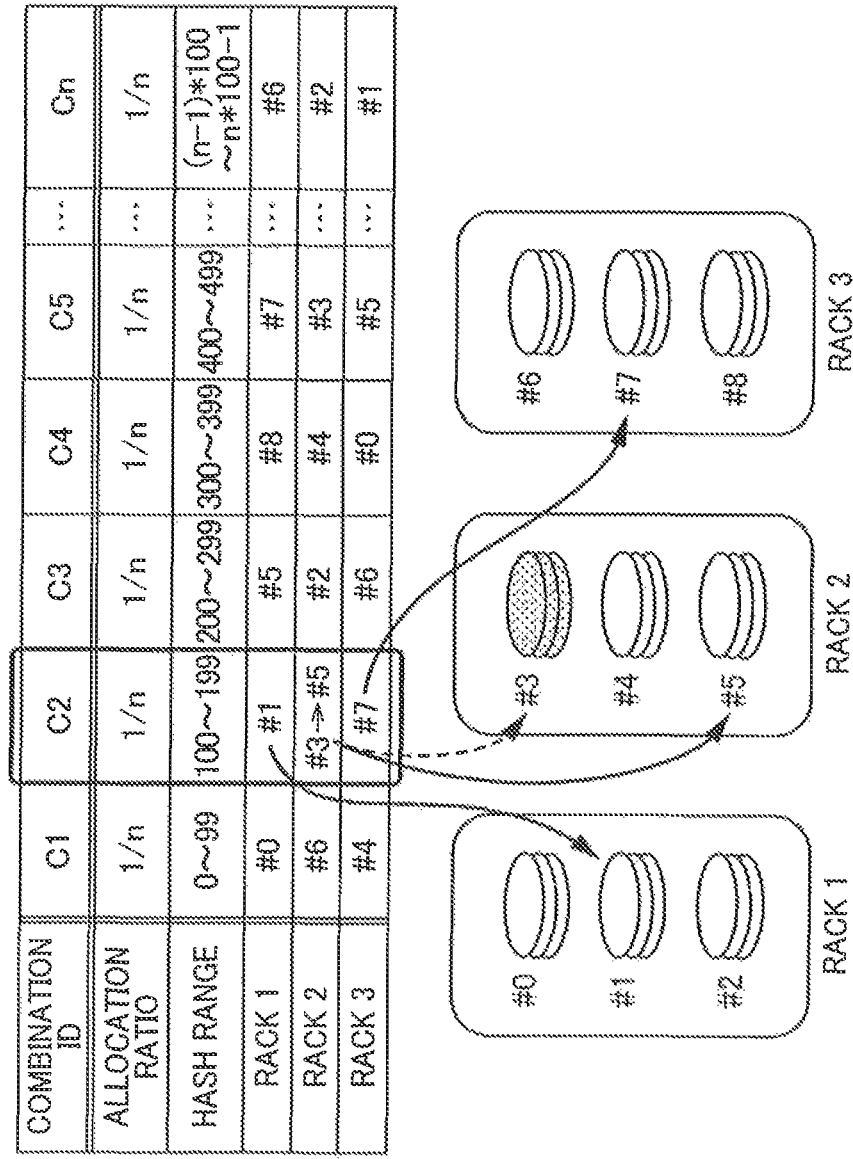
FIG. 16 is a diagram illustrating an overview of a storage system according to a third embodiment.

The storage system according to the third embodiment will be described with reference to FIG. 16 to FIG. 19. FIG. 16 illustrates an overview of the storage system according to the present embodiment.

In the aforementioned embodiments, the management apparatus 3 has been described which reduces the loss probability $P_{lost}$ by reducing the allocation ratio wcj of the storage combination Cj having a high failure probability Pcj.

In contrast, as shown in FIG. 16, when the failure probability Pcj of the storage combination Cj is high, the management apparatus 3 according to the present embodiment reduces the loss probability $P_{lost}$ by replacing a storage #i included in the storage combination Cj. In the example in FIG. 16, the storage #3 of the storage combination C2 is replaced by the storage #5.

Figure 17:
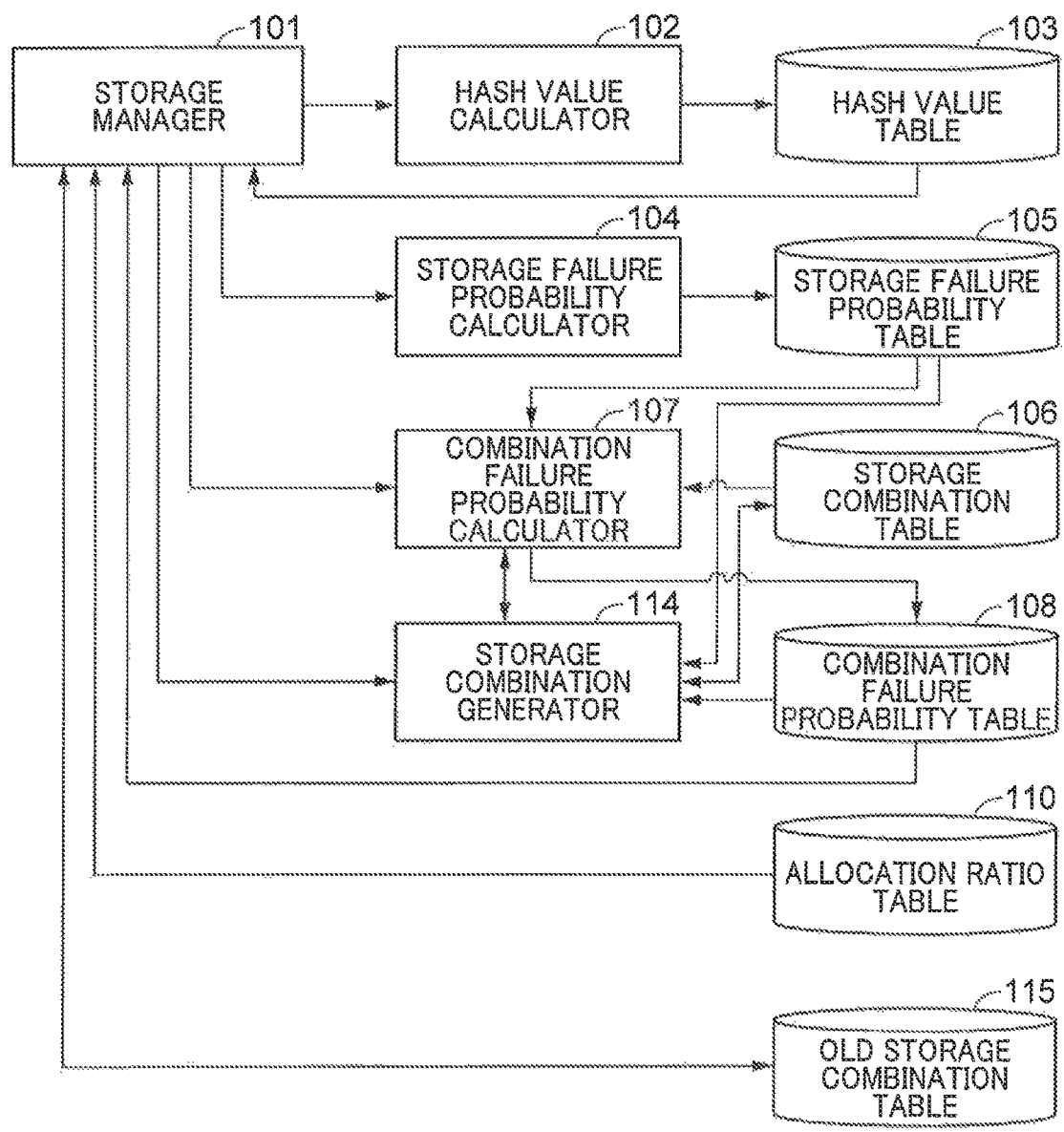
FIG. 17 is a diagram illustrating an example of a functional configuration of a storage management apparatus according to the third embodiment.

Here, FIG. 17 is a diagram illustrating an example of a functional configuration of the management apparatus 3 according to the present embodiment. As shown in FIG. 17, the management apparatus 3 is provided with a storage combination generator 114 and an old storage combination table 115 instead of the allocation ratio calculator 109 and the old allocation ratio table 111. The rest of the configuration is similar to that of the first embodiment.

The storage combination generator 114 generates a new storage combination Cj' from the original storage combination Cj based on a failure probability Pi of each storage #i. More specifically, the storage combination generator 114 replaces a storage #imax of the highest failure probability Pi of the storage #i included in the original storage combination Cj by another storage #i'. A new storage combination Cj' including the other storage #i' is generated in this way.

The storage combination generator 114 selects a storage #i having a lower failure probability Pi than the storage #imax as another storage #i'. That is, the failure probability Pi' of the other storage #i' is lower than a failure probability Pimax of the storage #imax. The storage combination generator 114 selects such a storage #i' with reference to the storage failure probability table 105.

A failure probability Pcj' of the new storage combination Cj' generated in this way is lower than the failure probability Pcj of the original storage combination Cj. The same applies to a case where the failure probability Pcj is any one of a product, a sum and a maximum value of failure probability Pi of each storage #i included in the storage combination Cj.

For example, in the example in FIG. 16, the original storage combination C2 includes storages #1, #3 and #7 and the new storage combination C2' includes storages #1, #5 and #7. That is, storage #3 corresponds to storage #imax and storage #5 corresponds to storage #i'. Therefore, the failure probability P5 is lower than the failure probability P3.

For example, if P3=0.2 and P5=0.1, the failure probability Pc2 of the original storage combination C2 is P1×0.2×P7 and the failure probability Pc2' of the new storage combination C2' is P1×0.1×P7, which shows that the failure probability decreases. The storage combination generator 114 stores the generated new storage combination Cj' in the storage combination table 106. In this way, the original storage combination Cj is updated to the new storage combination Cj'.

The old storage combination table 115 stores the storage combination Cj before being updated by the storage combination generator 114. The old storage combination table 115 is used to re-store the data in the storage group according to the updated storage combination Cj' instead of the data stored in the storage group according to the storage combination Cj before the update.

Figure 18:
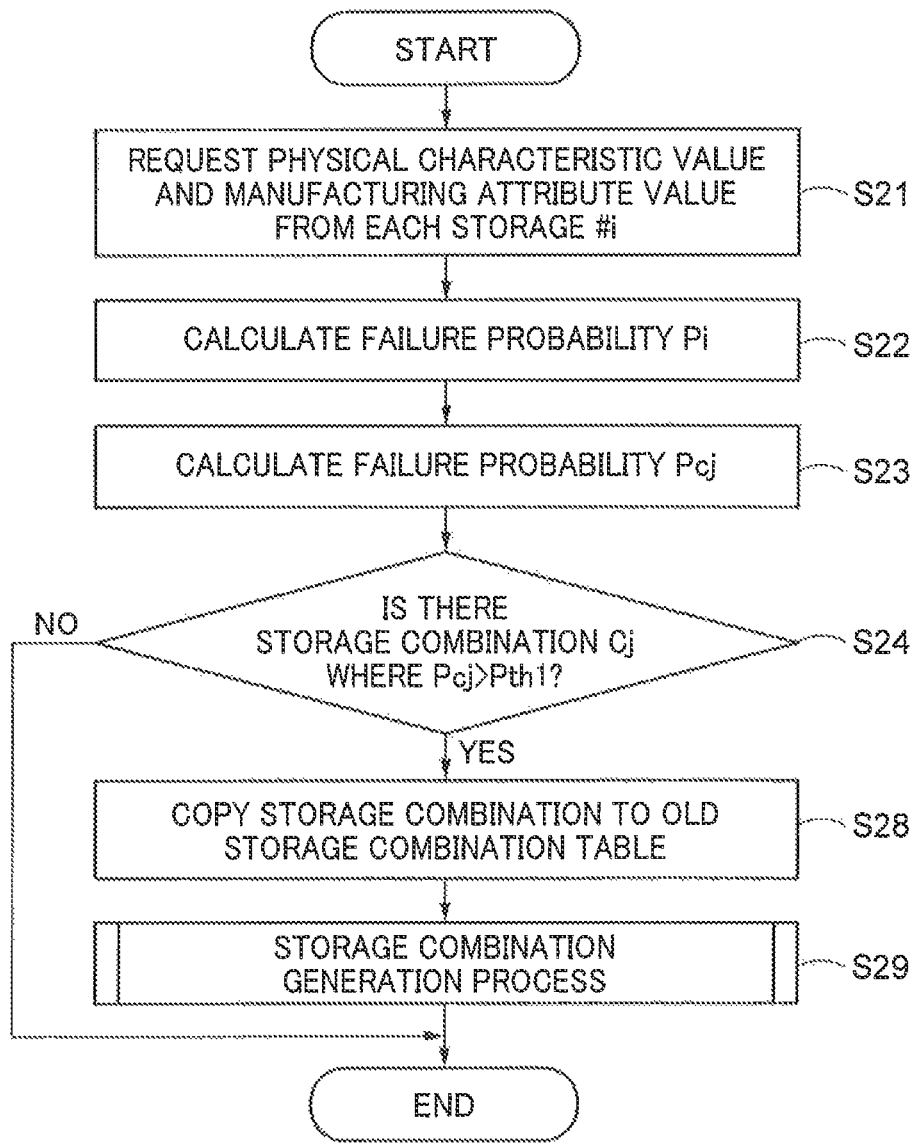
FIG. 18 is a flowchart illustrating a storage combination update process by the storage management apparatus according to the third embodiment.

Next, the update process of the storage combination Cj by the management apparatus 3 according to the present embodiment will be described with reference to FIG. 18 and FIG. 19. FIG. 18 is a flowchart illustrating an update process of the storage combination Cj by the management apparatus 3 according to the present embodiment. Note that steps S21 to S24 in the flowchart in FIG. 18 and the normal operation of the management apparatus 3 are similar to those of the first embodiment.

In the present embodiment, when there is a storage combination Cj whose failure probability Pcj Is greater than a threshold Pth1 (YES in step S24), the storage manager 101 copies the storage combination table 106 to the old storage combination table 115 (step S28). The storage manager 101 then causes the storage combination generator 114 to execute a process of generating a new storage combination Cj'.

The storage combination generator 114 executes the process of generating a new storage combination Cj' at the request from the storage manager 101 (step S29). After that, the storage manager 101 terminates the update process.

Figure 19:
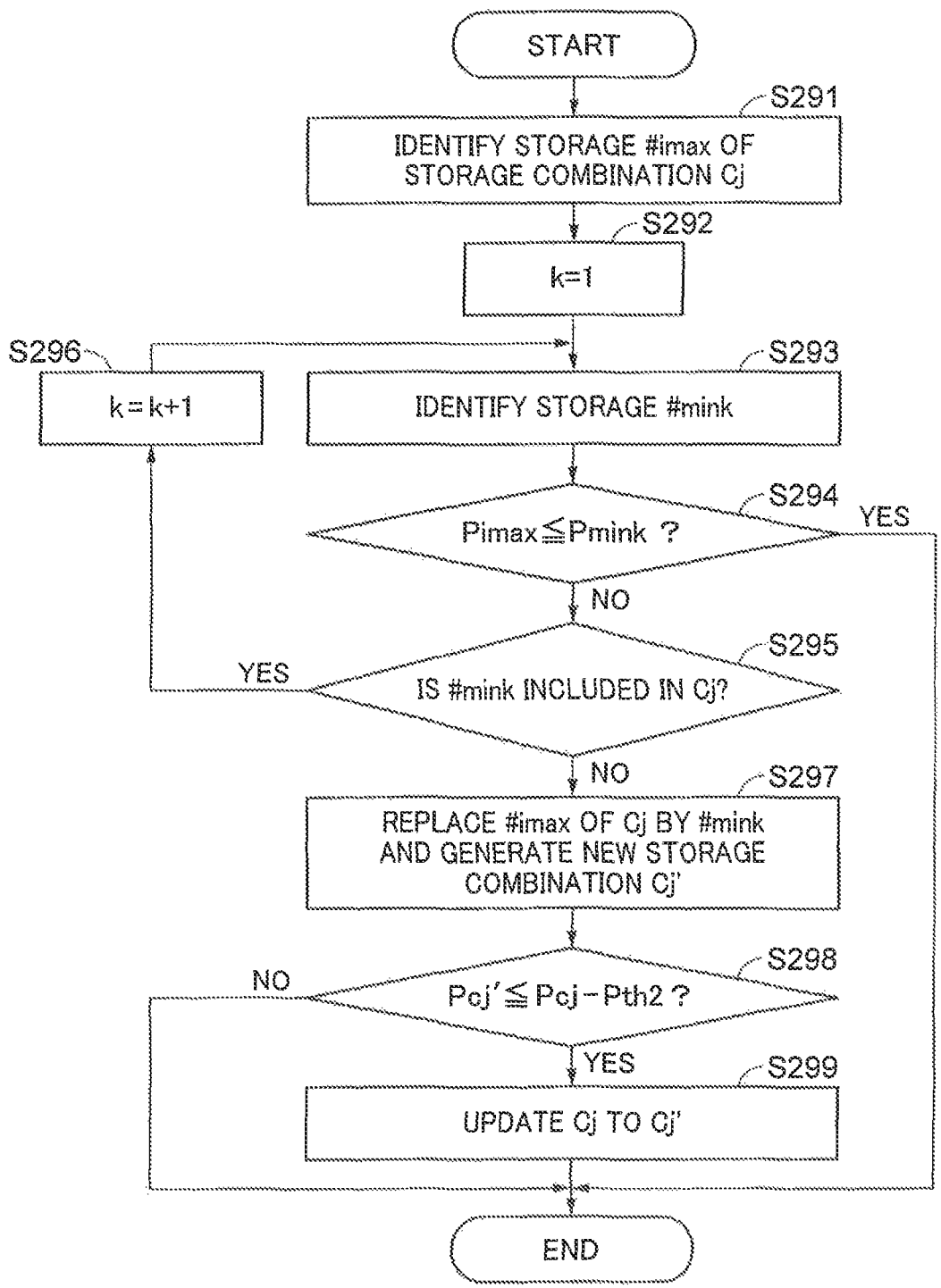
FIG. 19 is a flowchart illustrating a storage combination generation process by a storage combination generation section.

FIG. 19 is a flowchart illustrating processes of generating a storage combination by the storage combination generator 114. The processes shown in FIG. 19 correspond to step S29 in FIG. 18.

Therefore, step S291 in FIG. 19 is executed after step S28 in FIG. 18.

Hereinafter, a case will be described as an example where the number of storage combinations Cj whose failure probability Pcj is greater than the threshold Pth1 is one.

As shown in FIG. 19, the storage combination generator 114 first identifies each storage #i included in the storage combination Cj with reference to the storage combination table 106 and identifies storage #imax having the maximum failure probability Pi among the identified respective storages #i by referring to the storage failure probability table 105 (step S291).

Next, the storage combination generator 114 initializes a variable k to 1 (step S292). the variable k is a variable indicating the ranking of the storage failure probability Pi of the storage #i in ascending order of size and storage #imax is replaced by a storage #i corresponding to the ranking indicated by the variable k.

Next, the storage combination generator 114 identifies the storage #mink whose failure probability Pi is the k-th smallest among all storages #i by referring to the storage failure probability table 105 (step S293). Here, a storage #min1 whose failure probability Pi is minimum is identified.

The storage combination generator 114 determines whether or not a failure probability Pimax of the storage #imax is equal to or less than a failure probability Pmink of the storage #mink (step S294).

In a case where the failure probability Pimax is equal to or less than the failure probability Pmink (YES in step S294), the storage combination generator 114 terminates the generation process. This is because the case where the failure probability Pimax is equal to or less than the failure probability Pmink corresponds to a case where there is no storage #i whose failure probability Pi is lower than the storage #imax.

On the other hand, when the failure probability Pimax is greater than the failure probability Pmink (NO in step S294), the storage combination generator 114 determines whether or not the storage #mink is included in the original storage combination Cj by referring to the storage combination table 105 (step S295).

When the storage #mink is included in the original storage combination Cj (YES in step S295), the storage combination generator 114 increases the variable k by 1 (step S296). After that, the generation process returns to step S293 where the storage combination generator 114 identifies a new storage #mink (step S293).

That is, in the example in FIG. 19, when the storage #mink is included in the original storage combination Cj, the storage #imax is not replaced by the storage #mink. This is because when the storage #imax is replaced by the storage #mink, the number of storages #i included in the storage combination Cj' is decremented by one.

Here, to maintain the redundancy of the storage system, the number of storages #i included in the storage combination Cj is assumed to be constant. For this reason, when the number of storages #i included in the storage combination Cj' decreases, the storage combination generator 114 does not replace the storage #imax by the storage #mink.

However, when the number of storages #i included in the storage combination Cj can be decreased, even when the storage #mink is included in the original storage combination Cj, the storage combination generator 114 may replace the storage #imax by the storage #mink. That is, even when the storage #mink is included in the original storage combination Cj (YES in step S295), the generation process may proceed to step S297.

Examples of such a case include a case where a reduction of a data loss probability is more important than the redundancy of the storage system and a case where sufficient redundancy is secured for the storage system so that even decrement by one in the number of storages #i included in the storage combination Cj would not matter.

On the other hand, when the storage #mink is not included in the original storage combination Cj (NO in step S295), the storage combination generator 114 replaces the storage #imax of the storage combination Cj by the storage #mink to generate a new storage combination Cj' (step S297).

After that, the storage combination generator 114 passes the new storage combination Cj' to the combination failure probability calculator 107 and receives the failure probability Pcj' of the storage combination Cj' calculated by the combination failure probability calculator 107. The storage combination generator 114 determines whether or not the failure probability Pcj' is smaller than the failure probability Pcj by a predetermined threshold Pth2 or more by referring to the combination failure probability table 108 (step S298).

When the failure probability Pcj' is not smaller than the failure probability Pcj by a predetermined threshold Pth2 or more (NO in step S298), the storage combination generator 114 terminates the generation process. This is because when the failure probability Pcj' is not smaller than the failure probability Pcj by a predetermined threshold Pth2 or more, even when the storage combination Cj is updated, the effect of reducing the failure probability Pcj is small.

Avoiding the update process from being executed in such a case will make it possible to suppress update frequencies, improve the stability of operation of the management apparatus 3 and suppress the amount of calculation of the management apparatus 3. Note that the threshold Pth2 can be set freely.

On the other hand, when the failure probability Pcj' is smaller than the failure probability Pcj by the threshold Pth2 or more (YES in step S298), the storage combination generator 114 stores the new storage combination Cj' in the storage combination table 106 and updates the original storage combination Cj to the new storage combination Cj' (step S299). After that, the generation process and the update process are terminated.

The management apparatus 3 may execute the above-described update process at a predetermined time interval or according to an execution instruction inputted from the user of the management apparatus 3. After the update process is executed, the storage manager 101 may re-store the data according to the updated storage combination Cj' instead of the data stored according to the storage combination Cj before the update.

Furthermore, when there exist a plurality of storage combinations Cj whose failure probability Pcj is greater than the threshold Pth1, the storage combination generator 114 may execute the generation processes in step S291 to step S299 on each storage combination Cj.

As described above, the management apparatus 3 according to the present embodiment replaces a storage #i having a high failure probability Pi included in the storage combination Cj by another storage #i having a low failure probability Pi to thereby generate a new storage combination Cj'. The management apparatus 3 updates the original storage combination Cj to a new storage combination Cj'.

This allows the storage combination Cj having a high failure probability Pcj to be updated to the storage combination Cj' having a lower failure probability Pcj', making it possible to reduce a data loss probability and suppress losses of received data.

Note that in the example in FIG. 17, the management apparatus 3 is not provided with the allocation ratio calculator 109 or the old allocation ratio table 111, but a configuration including them is also possible. In this case, the management apparatus 3 is enabled to execute the update process of the allocation ratio wcj and the update process of the storage combination Cj. The management apparatus 3 may execute the update process of the allocation ratio wcj and the update process on the storage combination Cj consecutively or may execute those processes at different timings.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A storage management apparatus to manage a plurality of storage combinations which are combinations of storages included in a storage group, comprising:
a combination failure probability calculator to calculate a failure probability of the storage combination based on a failure probability of each of the storage; and
an allocation ratio calculator to calculate an allocation ratio indicating a ratio at which received data is allocated to the storage combination based on the failure probability of the storage combination,
wherein the storage management apparatus allocates the received data to one of the storage combinations according to the allocation ratio.

2. The storage management apparatus according to claim 1, wherein the allocation ratio calculator calculates the allocation ratio such that the allocation ratio decreases as the failure probability of the storage combination increases.

3. The storage management apparatus according to claim 1, wherein the combination failure probability calculator calculates a product, a sum or a maximum value of the failure probabilities of the respective storages included in the storage combination as the failure probability of the storage combination.

4. The storage management apparatus according to claim 1, further comprising a storage failure probability calculator to calculate the failure probability of the storage.

5. The storage management apparatus according to claim 4, wherein the storage failure probability calculator calculates the failure probability of the storage based on at least one of operating time, energizing time, number of times of reading or writing, number of retries of reading or writing, error rate of reading or writing, response speed, S.M.A.R.T. information, maker, lot number, number of disks, number of chips, manufacturing maker, place of manufacture, firmware version, and manufacturing date and time of the storage.

6. The storage management apparatus according to claim 1, wherein the allocation ratio calculator calculates a hash range of the storage combination based on the allocation ratio of the storage combination.

7. The storage management apparatus according to claim 1, wherein the storage combination includes one or a plurality of the storages.

8. The storage management apparatus according to claim 1, further comprising a use frequency calculator to calculate a use frequency of each of the storage based on the allocation ratio of the storage combination.

9. The storage management apparatus according to claim 8, wherein the allocation ratio calculator calculates the allocation ratio such that the use frequency of each of the storage satisfies a predetermined condition.

10. The storage management apparatus according to claim 1, wherein the allocation ratio calculator calculates the allocation ratio such that the sum of products of the failure probability of each of the storage combination and the allocation ratio decreases.

11. The storage management apparatus according to claim 1, further comprising a storage combination generator to generate a new storage combination from the original storage combination based on a failure probability of each of the storage,
wherein the failure probability of the new storage combination is lower than the failure probability of the original storage combination.

12. The storage management apparatus according to claim 11, wherein the storage combination generator generates the new storage combination by replacing the storage having the highest failure probability among the storages included in the original storage combination by another storage.

13. A storage system comprising the storage management apparatus according to claim 1 and a plurality of storages in which a plurality of storage combinations are set.

14. The storage system according to claim 13, wherein the storage stores data corresponding to the received data allocated to the storage combination in which the storage is included.

15. The storage system according to claim 14, wherein the data corresponding to the received data is data obtained by replicating the received data or data obtained by dividing the received data and adding an erasure code.

16. A storage management method to manage a plurality of storage combinations which are combinations of storages included in a storage group, the method comprising:
   calculating a failure probability of the storage combination based on a failure probability of the storage;
   calculating an allocation ratio indicating a ratio at which received data is allocated to the storage combination based on the failure probability of the storage combination; and
   allocating the received data to one of the storage combinations according to the allocation ratio.

* * * * *